US011790087B2

(12) United States Patent
Mishra et al.

(10) Patent No.: US 11,790,087 B2
(45) Date of Patent: Oct. 17, 2023

(54) METHOD AND APPARATUS TO IDENTIFY HARDWARE PERFORMANCE COUNTER EVENTS FOR DETECTING AND CLASSIFYING MALWARE OR WORKLOAD USING ARTIFICIAL INTELLIGENCE

(71) Applicant: Intel Corporation, Santa Clara, CA (US)

(72) Inventors: Deepak Kumar Mishra, Tamil Nadu (IN); Prajesh Ambili Rajendran, Telangana (IN); Taj un nisha N, TamilNadu (IN); Rahuldeva Ghosh, Portland, OR (US); Paul Carlson, Hillsboro, OR (US); Zheng Zhang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 250 days.

(21) Appl. No.: 17/132,248

(22) Filed: Dec. 23, 2020

(65) Prior Publication Data

US 2021/0110038 A1  Apr. 15, 2021

(51) Int. Cl.
*G06F 21/55* (2013.01)
*G06F 21/56* (2013.01)
*G06N 20/00* (2019.01)

(52) U.S. Cl.
CPC .......... *G06F 21/566* (2013.01); *G06F 21/564* (2013.01); *G06F 21/568* (2013.01); *G06N 20/00* (2019.01)

(58) Field of Classification Search
CPC .... G06F 21/566; G06F 21/564; G06F 21/568; G06N 20/00
See application file for complete search history.

(56) References Cited

U.S. PATENT DOCUMENTS

2012/0072987 A1* 3/2012 Koelle ................... G06N 5/043
726/23
2016/0275288 A1* 9/2016 Sethumadhavan ... H04L 9/3239
(Continued)

FOREIGN PATENT DOCUMENTS

CN   114662094 A    6/2022
DE   102021129862 A1  6/2022

OTHER PUBLICATIONS

Nisarg Patel, Avesta Sasan, Houman Homayoun, Analyzing Hardware Based Malware Detectors, 2017, IEEE (Year: 2017).*

*Primary Examiner* — Joseph P Hirl
*Assistant Examiner* — Aayush Aryal
(74) *Attorney, Agent, or Firm* — JAFFERY WATSON MENDONSA & HAMILTON LLP

(57) ABSTRACT

A method comprises generating a first set of hardware performance counter (HPC) events that is ranked based on an ability of an individual HPC event to profile a malware class, generating a second set of HPC event combinations that is ranked based on an ability of a set of at least two joint HPC events to profile a malware class, generating a third set of extended HPC event combinations, profiling one or more malware events and one or more benign applications to obtain a detection accuracy parameter for each malware event, applying a machine learning model to rank the third set of HPC event combinations based on malware detection accuracy, and applying a genetic algorithm to the third set of HPC event combinations to identify a subset of the third set of extended combinations of HPC events to be used for malware detection and classification.

21 Claims, 10 Drawing Sheets

(56) References Cited

U.S. PATENT DOCUMENTS

2017/0154181 A1* 6/2017 Venkataramani ..... G06F 21/566
2018/0268142 A1* 9/2018 Sethumadhavan .... G06N 20/00
2022/0121744 A1* 4/2022 Mishra ................... G06N 3/044

* cited by examiner

METHOD AND APPARATUS TO IDENTIFY HARDWARE PERFORMANCE COUNTER EVENTS FOR DETECTING AND CLASSIFYING MALWARE OR WORKLOAD USING ARTIFICIAL INTELLIGENCE

BACKGROUND

Malware detection is a constant cat-and-mouse game in which malware authors devise new and more sophisticated ways of concealing or obfuscating their code in binary, filesystem and memory from security software. Bare metal hardware, especially the CPU, is one place though where hiding stops and CPU telemetry can reveal the execution pattern of malicious code at the lowest level. There are hundreds or thousands of events such as, e.g., hardware performance counter (HPC) events available on modern processors and only a small subset 'n' (n may be 4 to 8) of them can be configured at a time for simultaneous monitoring. Identifying the best set of hardware telemetry events to detect a malware class is a complex problem because malware can exhibit diverse behavior. Thus, monitoring multiple events together will have best chance to profile it. By way of example, applying brute force to find best four-event combination out of 500 events will require testing of $500C_{n=4}$ (over 2.5 billion) combinations and is practically infeasible to do in a reasonable timeframe. Accordingly, security researchers study the malware and event documents and correlate them to find relevant events using trial and error. This process requires human resource and lot of time and still may not yield the optimum event set. The requirement is to find the optimum 'n' event set to profile a given malware class.

Previous approaches of selecting the best 'n' HPC event combination to profile a malware/workload required human analysis and significant trial and error to identify relevant HPC events. Significant data science efforts need to be applied to the selected event set to generate optimal Machine Learning model to detect malware/workload and are static in logic. Malwares can skip detection by changing deployment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
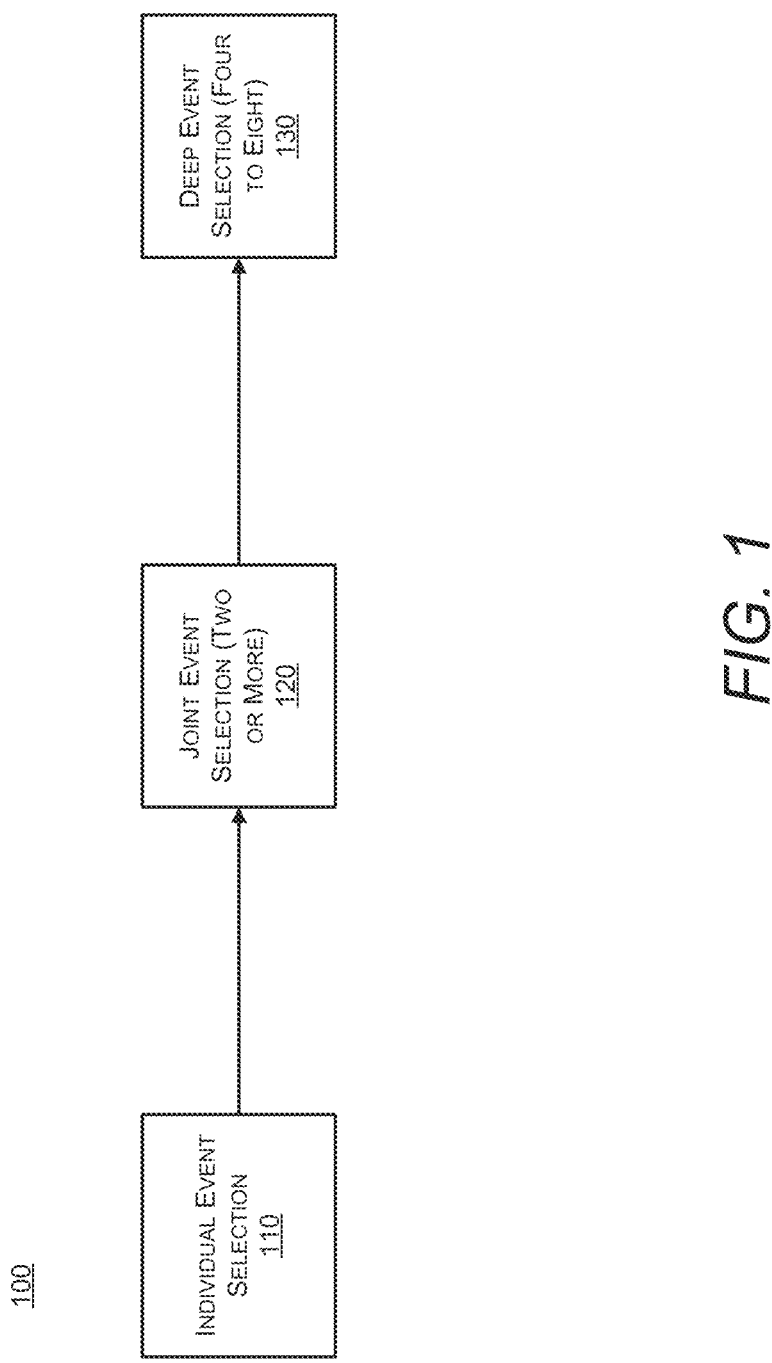
FIGS. 1-3 are high-level flow diagrams illustrating operations in a method to identify hardware performance counters events to detect and classify malware using artificial intelligence in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C) Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described above, previous approaches of selecting the best 'n' HPC event combination to profile a malware/workload required human analysis and significant trial and error to identify relevant HPC events. Significant data science efforts need to be applied to the selected event set to generate optimal Machine Learning model to detect malware/workload. and are static in logic. Malwares can skip detection by changing deployment.

To address these and other issues, described herein are techniques to automate the process of identifying the best 'n' HPC events (n can be 4 to 8 on most processors) to profile a class of malware out of entire set of 'N' HPC events supported on any given platform (N can be hundreds to thousands).

Figure 2:
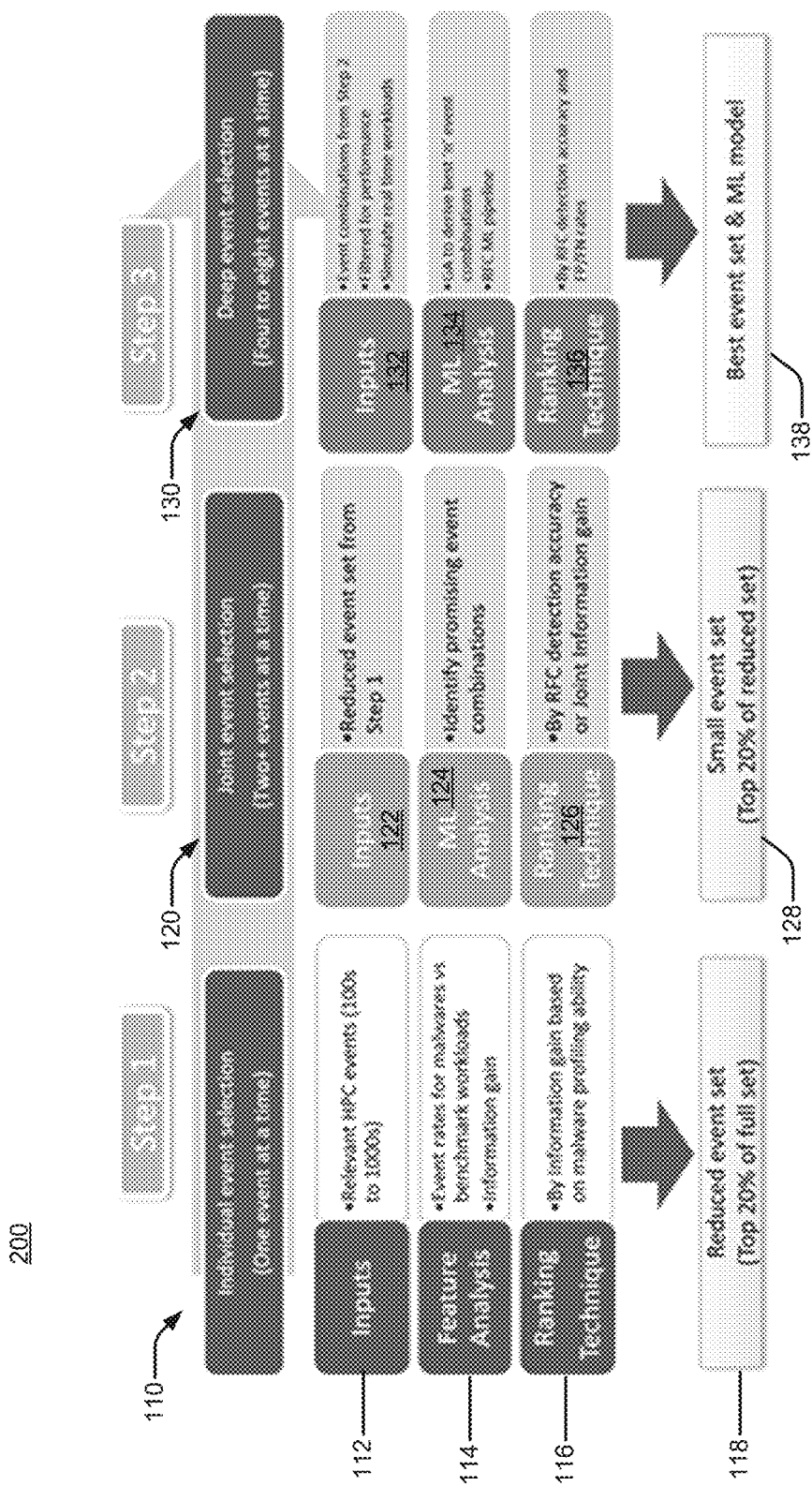
Figure 3:
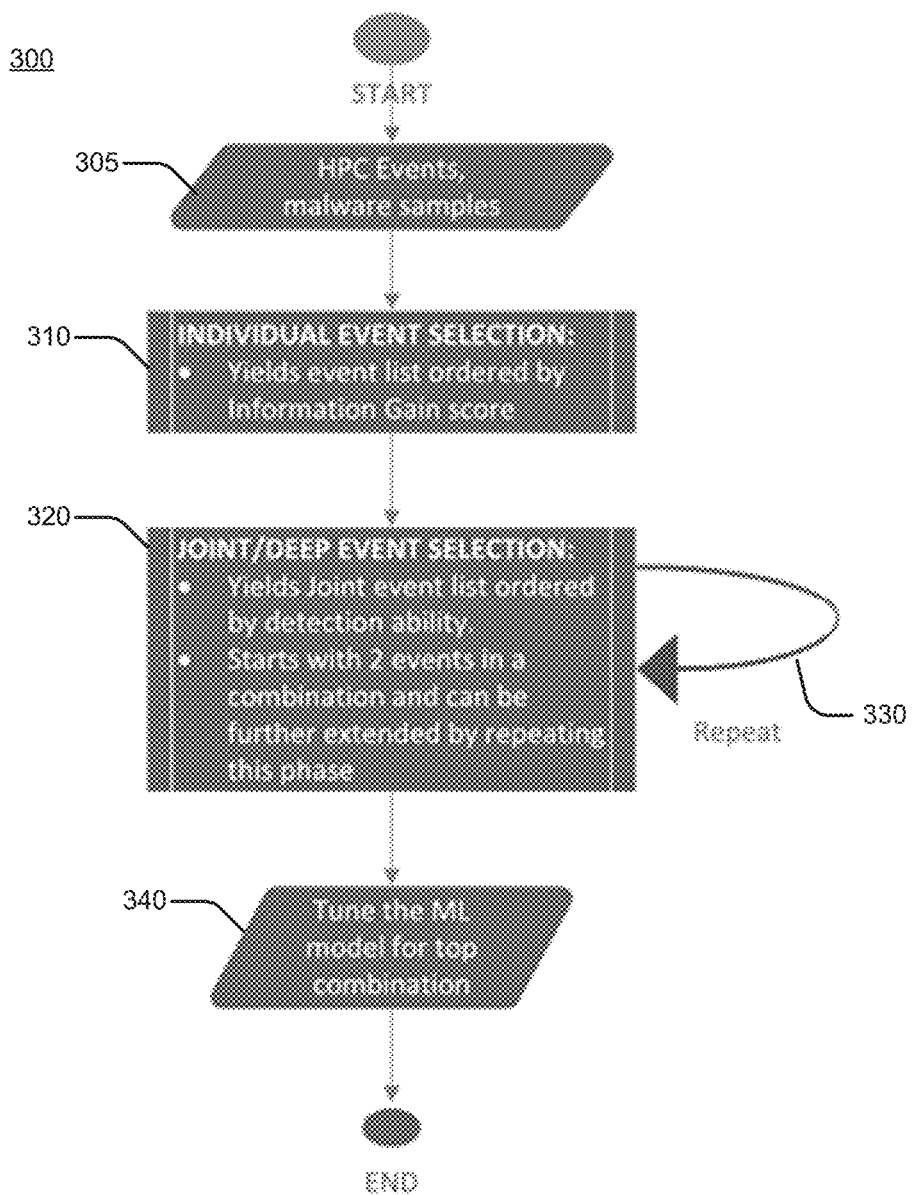

FIGS. 1-3 are high-level flow diagrams illustrating operations in a method to identify hardware performance counters events to detect and classify malware using artificial intelligence in accordance with an embodiment. Referring first to FIG. 1, in some examples a three-part process 100 to identify a best set of events to profile a class of malware comprises an individual event selection process 110, a joint event selection process 120, and a deep event selection process 130.

Referring to FIG. 2, in some examples 200 the individual even election process 110 receives inputs 112 including hundreds or even thousands of relevant hardware performance counter (HPC) events. The process 110 performs a feature analysis 114 including assessing event rates for malware against benchmark workloads and/or an information gain analysis. The process 110 implements a ranking technique 116, e.g., by information gain based an ability of an individual HPC event to profile a malware class. The process 110 then produces a reduced event set 118 by selecting, e.g., the top-ranked twenty percent (20%) of the individual events.

In some examples the joint event selection process 120 receives inputs 122 including the reduced event set 118 generated by the process 110. The joint event selection process 120 performs a machine learning (ML) analysis 124 to identify promising combinations of events based on an ability of a set of at least two joint HPC events to profile a malware class. The joint event selection process 120 then implements a ranking technique 126 to rank event combinations by Random Forest Classifier (RFC) detection accuracy or joint information gain. The process 120 then produces a reduced event set 128 by selecting, e.g., the top ranked twenty percent (20%) of the event combinations.

In some examples the deep event selection process 130 receives inputs 132 including the reduced event set 128 generated by the process 120. The inputs may be filtered for performance and may be used to simulate real-time workloads. The deep event selection process 130 performs a machine learning (ML) analysis 134 may include a genetic algorithm (GA) to derive the best event combinations and a RFC machine learning pipeline. The deep event selection process 130 then implements a ranking technique 136 to rank event combinations by RFC detection accuracy and False positive/False negative (FP/FN) rates. The process 120 then produces a best event set 138 and machine learning (ML) model.

Referring to FIG. 3, in some examples the individual event election process 300 starts with inputs 305 including hundreds or even thousands of relevant hardware performance counter (HPC) events and one or more malware samples. At block 310 an individual event selection process is implemented to yield an event list ordered by information gain scoring. Block 320 depicts the joint event selection and deep event selection process which yields a joint event list ordered by detection ability. The process starts with two events in a combination and can be further extended by repeating 330 the phase. At block 340 a machine learning (ML) model for the top combination is tuned.

Figure 4:
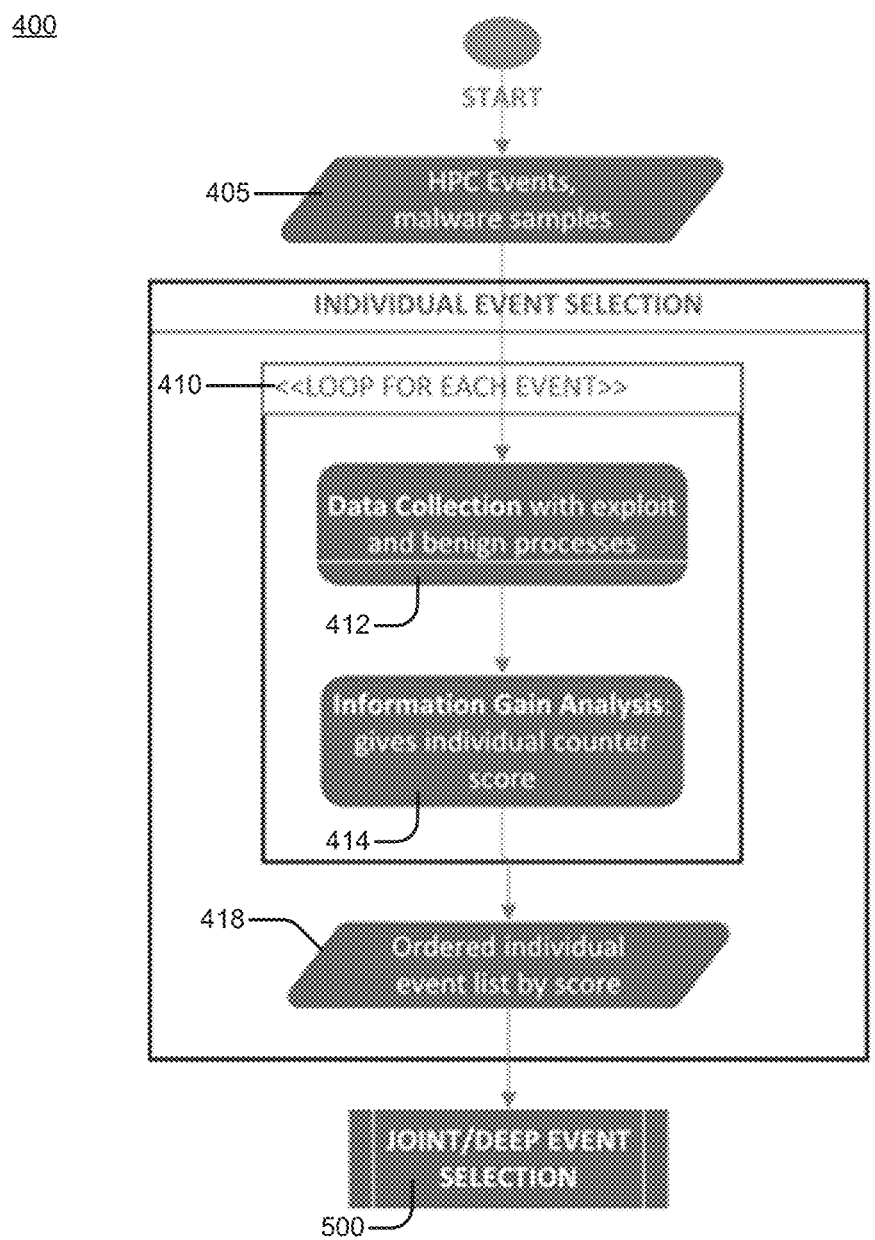
FIGS. 4-6 are more detailed flow diagrams illustrating operations in a method to identify hardware performance counters events to detect and classify malware using artificial intelligence in accordance with an embodiment.
Figure 5:
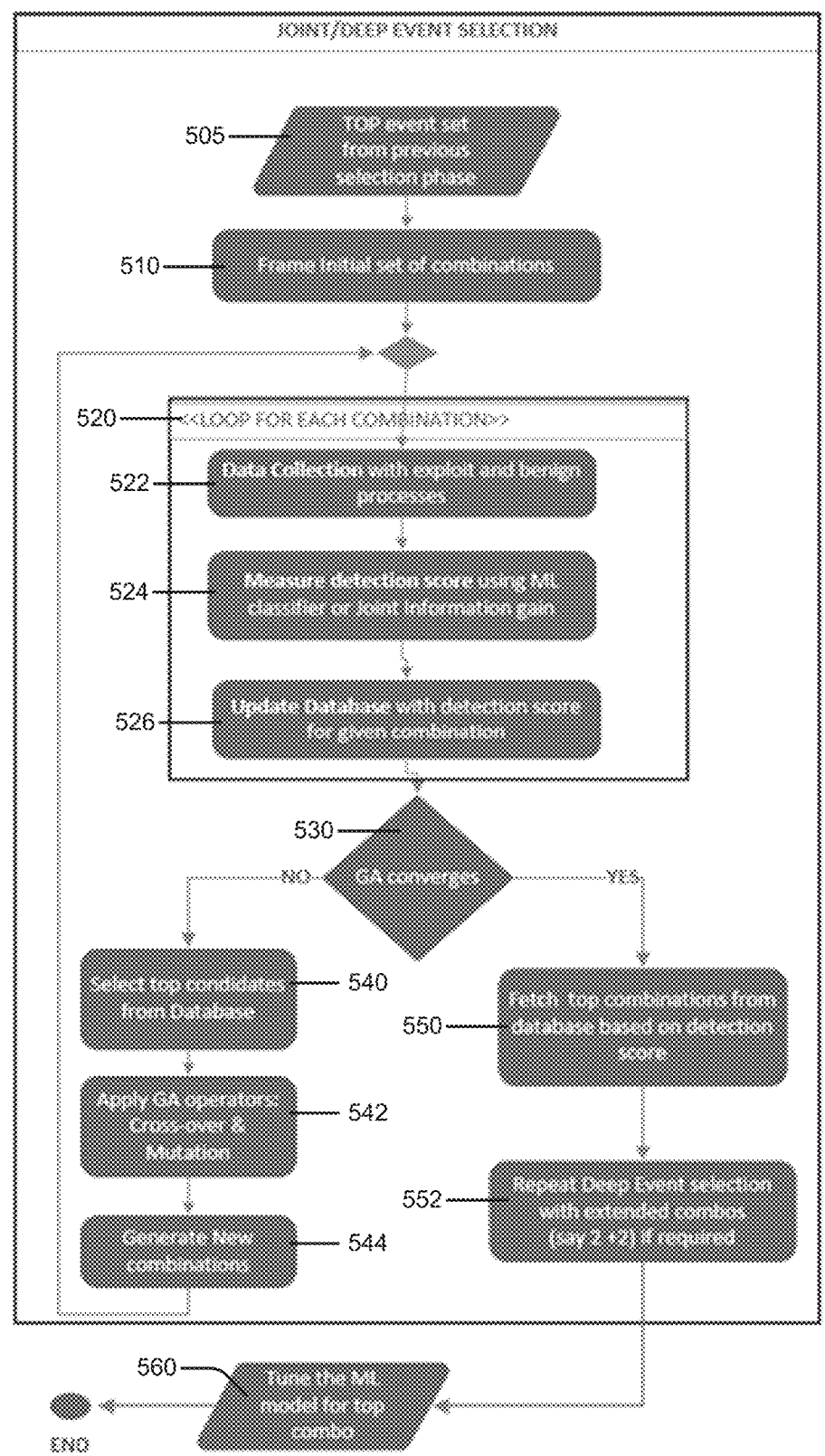
Figure 6:
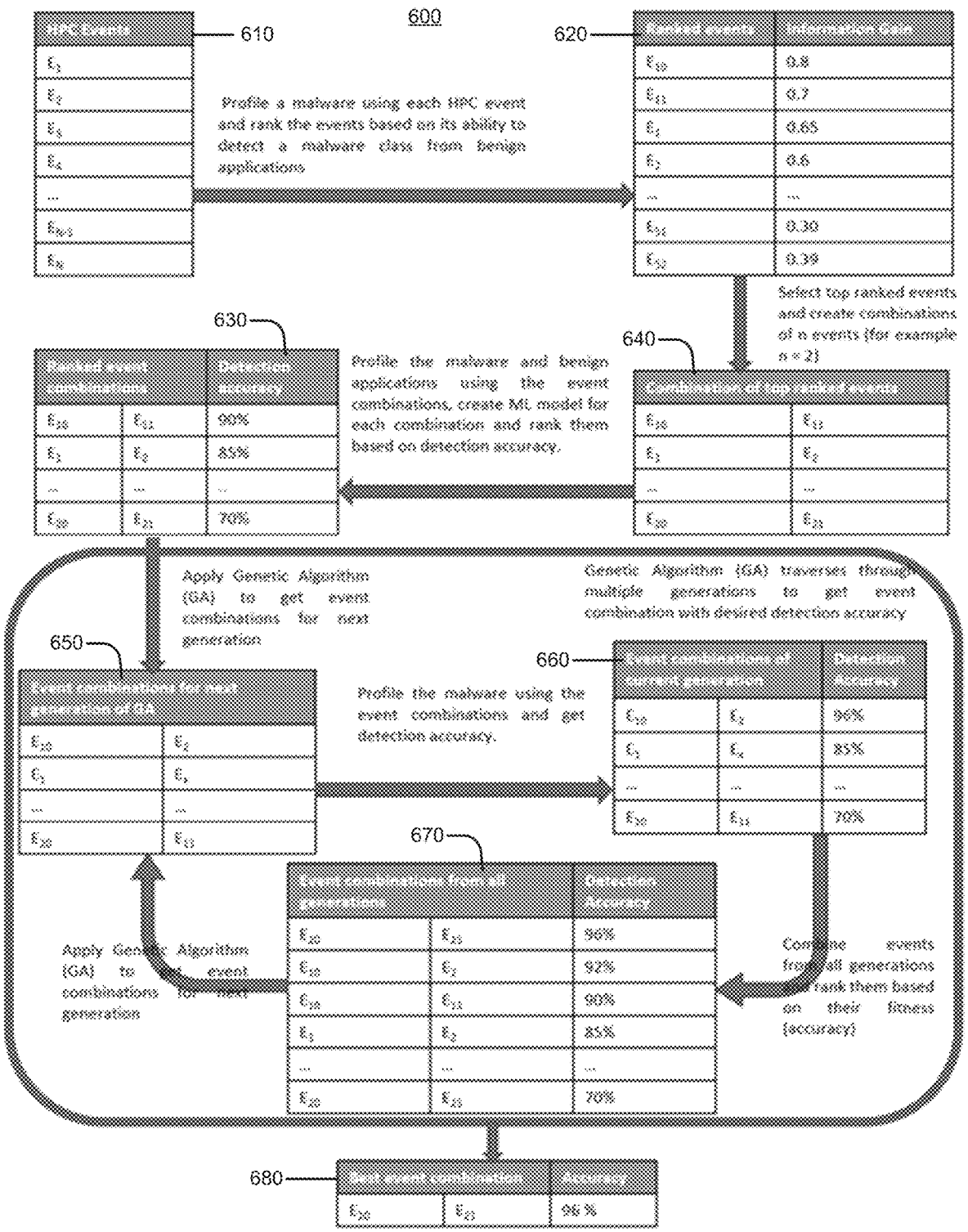

FIGS. 4-6 are more detailed flow diagrams illustrating operations in a method to identify hardware performance counters events to detect and classify malware using artificial intelligence in accordance with an embodiment. FIG. 4 illustrates operations in the individual event selection process 400. Referring to FIG. 4, in some examples the individual event selection process 400 receives inputs including one or more HPC events and malware samples. The process 400 then initiates a loop 410 pursuant to which, for each HPC event received in operation 405, a data collection process 412 is implemented with exploit (i.e., malware) and benign processes and at operation 414 an information gain analysis is performed to generate an individual counter score for the HPC event. At operation 418 the process generates an ordered individual list ranked by the score generated in operation 414.

FIG. 5 illustrates operations in the joint/deep event selection process 500. Referring to FIG. 5, at operation 505 the joint/deep selection process 500 receives inputs including the top-ranking (e.g., top 20%) of the events ranked in the individual event selection process 400 depicted in FIG. 4. At operation 510 the process 500 frames an initial set of event combinations from the set of events received in operation 505. At operation 520 the process 500 initiates a loop for each combination. In the loop, at operation 522 a data collection process 522 is implemented with exploit (i.e., malware) and benign processes, at operation 524 the detection score is measured using a Machine Learning classifier and/or an information gain analysis is performed to generate a joint information gain parameter for the combination, and at operation 526 a database is updated with a detection score for a given combination. The operations in the loop 520 may be repeated for a desired number of combinations or all combinations of events.

In some examples the process 500 applies a genetic algorithm to obtain event combinations and to traverse through the various event combinations to get combinations with a desired detection accuracy. At operation 530 it is determined whether the genetic algorithm converges. If, at operation 530, the genetic algorithm does not converge then control passes to operation 540 and the top candidates are selected from the database, at operation 542 one or more of a cross-over operator or a mutation operator is applied to the genetic algorithm to create, at operation 544, combinations that might be better. Control then passes back to the top of the loop 520, which is initiated with the new combinations generated in operation 544.

By contrast, if at operation 530 the genetic algorithm does converge then control passes to operation 550 and the top candidates are selected from the database based on the detection score determined in operation 526. At operation 552 the process is repeated with extended event combinations, if required. At operation 560 the machine language is tuned for the top combination generated by the process 500.

FIG. 6 illustrates data structures and operations in the joint/deep event selection process 600. Referring to FIG. 6, HPC events 610 receives inputs including the top-ranking (e.g., top 20%) of the events ranked in the individual event selection process 400 depicted in FIG. 4. The process 600 profiles a malware using each HPC event and ranks the events based their respective ability to detect a malware class from benign applications to generate a set of ranked events 620 that are ordered by an information gain parameter. The process 600 selects top-ranked events from the set of ranked events 620 and creates a set of combinations of at least two events 620, then profiles the malware and benign applications using the event combinations from the set of event combinations 640, creates a machine learning model for each combination, and ranks the combinations based on detection accuracy to produce a ranked set of combinations 630.

Next the process 600 enters a loop in which it first applies a genetic algorithm to get a set of event combinations 650 for the next generation of analysis. The process 600 then profiles the malware using the event combinations and gets a detection accuracy to construct a set of event combinations 660 ranked by detection accuracy. The process 600 then combines events from all generations and ranks them based on their fitness (i.e., accuracy in rating) to construct a ranked set of event combinations from all generations 670. If the genetic algorithm does not converge then the process 600 applies a genetic algorithm to get a set of event combinations 650 for the next generation. This cycle may be repeated until the genetic algorithm converges, at which point the process selects a set of the best event combinations 680 based on the accuracy of the combinations.

Figure 7:
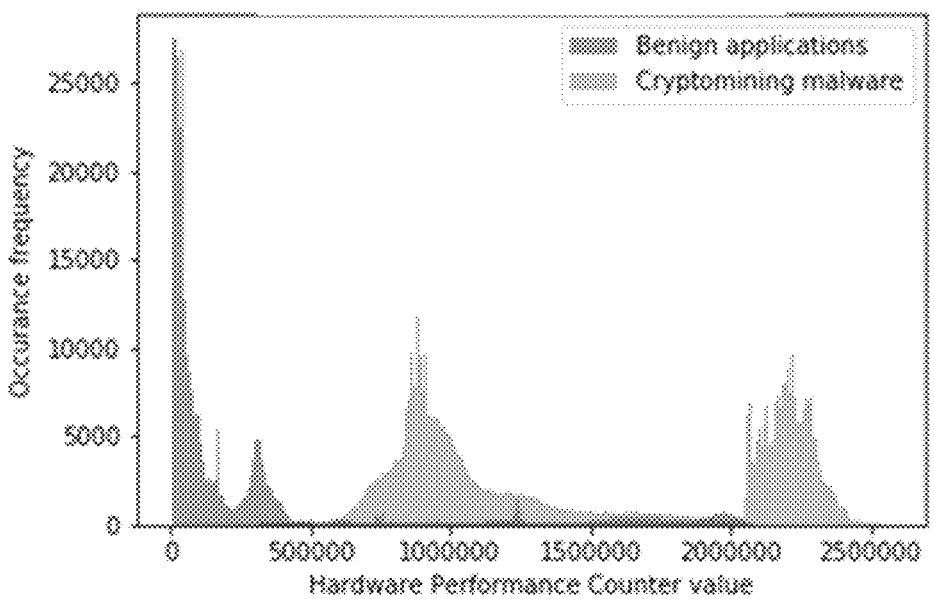
FIGS. 7-8 are graphs illustrating hardware performance counter frequencies over time, in accordance with an embodiment.
Figure 8:
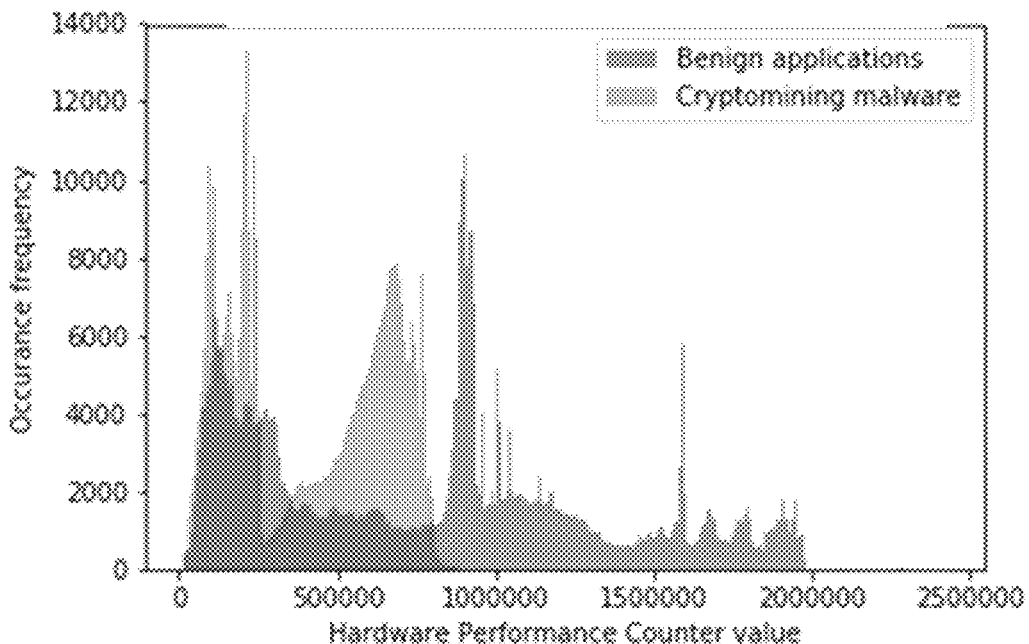

FIGS. 7-8 are graphs illustrating hardware performance counter frequencies over time, in accordance with an embodiment. Referring to FIG. 7, a histogram 700 illustrates how an HPC event (EVENT 1) is able to profile a crypto-mining malware from benign applications. Referring to FIG., a histogram 800 shows a clear separation between an HPC event (EVENT2) and benign applications. The profile with EVENT2 event shows that there is larger overlap between malware and benign applications counter values, so the information gain for this event will be lower.

In some examples, once hardware events are ranked according to their information gain values, a subset of top ranked events are selected for the joint info gain analysis, which measure the information gain of multiple events. This may be indicated by equation (1) as follows:

$$IG(Y, X1, X2, \ldots, Xn) = H(Y) - H(Y|X1, X2, \ldots, Xn) \quad \text{EQ 1}$$

X1, X2, ... Xn: n HPC events
IG (Y, X1, X2, ..., Xn): Information gain to classify malware vs benign using X1, X2, ... Xn
H(Y): Entropy of data for malware vs benign
H(Y|X1, X2, ... Xn): Entropy of data for malware vs benign with information from X1, X2, ... Xn Where X1, X2, ..., Xn represent a set of n HPC events. In some examples the following search algorithm is used to iteratively find the counter combinations that provide the highest information gain. First, a set of candidate two-event combinations of the top phase-1 events is created. Second, data records of benign and malicious classes for each candidate combination are collected. Third, the joint information gains for each combination are measured. Fourth, the event combinations are ranked based on joint information gains.

Figure 9:
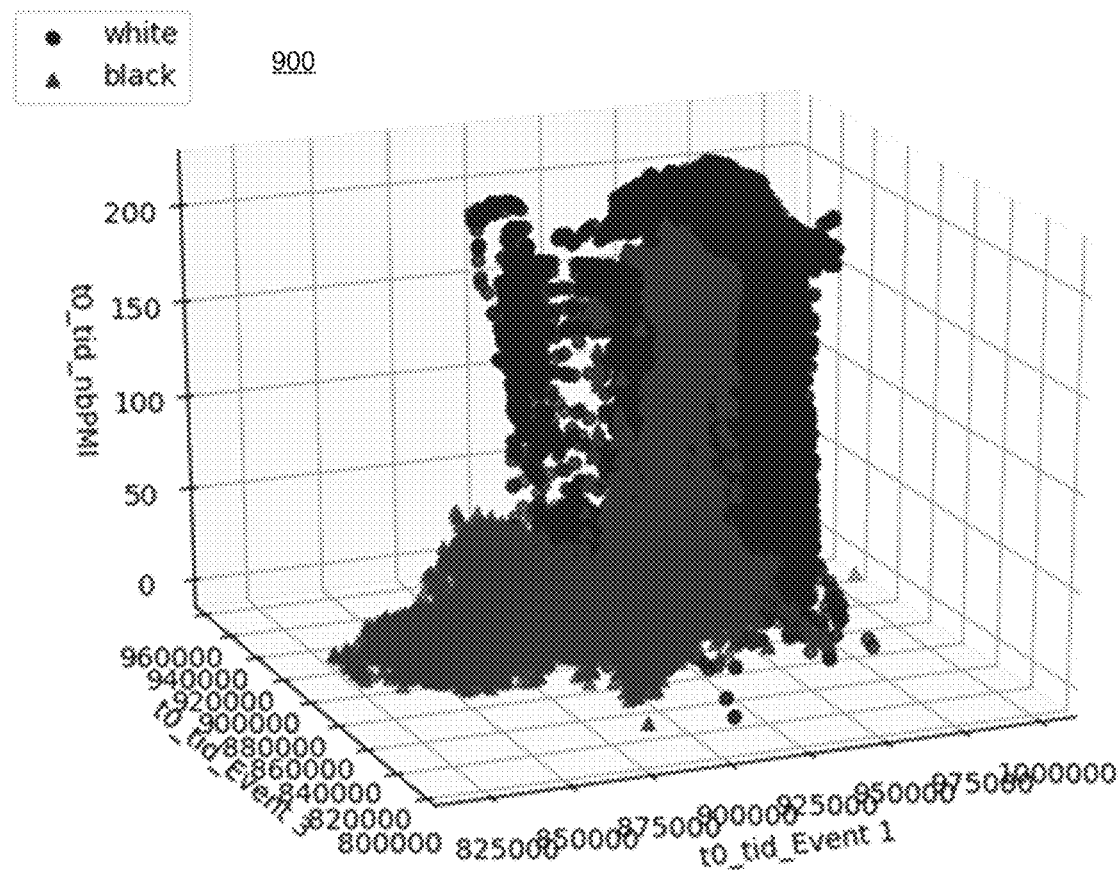
FIG. 9 is a three-dimensional graph illustrating benign and malicious distributions of a three-event combination of hardware performance counter events, in accordance with an embodiment.

FIG. 9 illustrates sample benign and malicious distributions of a three-event combination. As illustrated in FIG. 9, the benign and malicious data points 900 become more separated in the higher-dimension space that in each individual dimension.

In some examples the deep event selection process may be implemented using a genetic algorithm (GA). For example, once HPC events are ranked by their respective information gain as described above, a subset of top ranked events is selected for next step of creating extended combination of events. Each event combination is configured to profile malware along with relevant benign applications. The generated data is processed in a ML pipeline and ML model to distinguish a malware from benign applications is created and detection accuracy is measured. The combinations are ranked using the detection accuracy of its corresponding ML model. A genetic algorithm (GA) is used to create next set of combinations to intelligently find optimal event combination.

Figure 10:
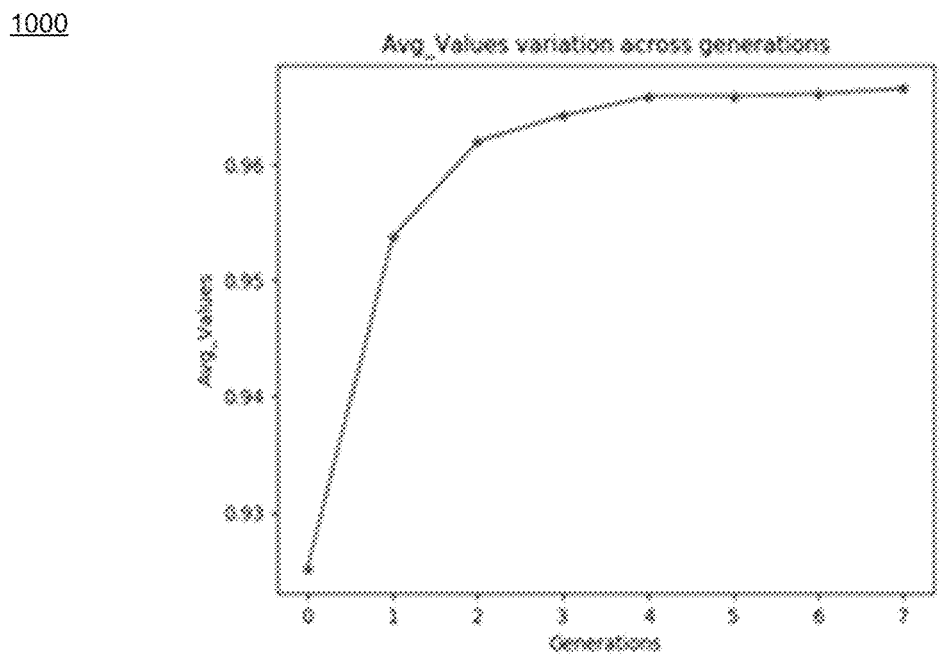
FIG. 10 is a graph illustrating detection accuracy as a function of the number of generations of a genetic algorithm, in accordance with an embodiment.

In some examples multiple generations of a genetic algorithm are used. A GA may be used to create next generation of possibly good event combinations using top ranked events from existing result. The detection accuracy of event combination is measure by going through a full ML pipeline (e.g., data collection, data processing, ML model creation and inferencing). After multiple generations of GA, once a combination with desired detection accuracy is found execution of the GA may be stopped and the best combination along with ML model is given as output of the infrastructure. FIG. 10 illustrates how the average detection accuracy of top event combinations 1000 converges through multiple generations of GA.

Figure 11:
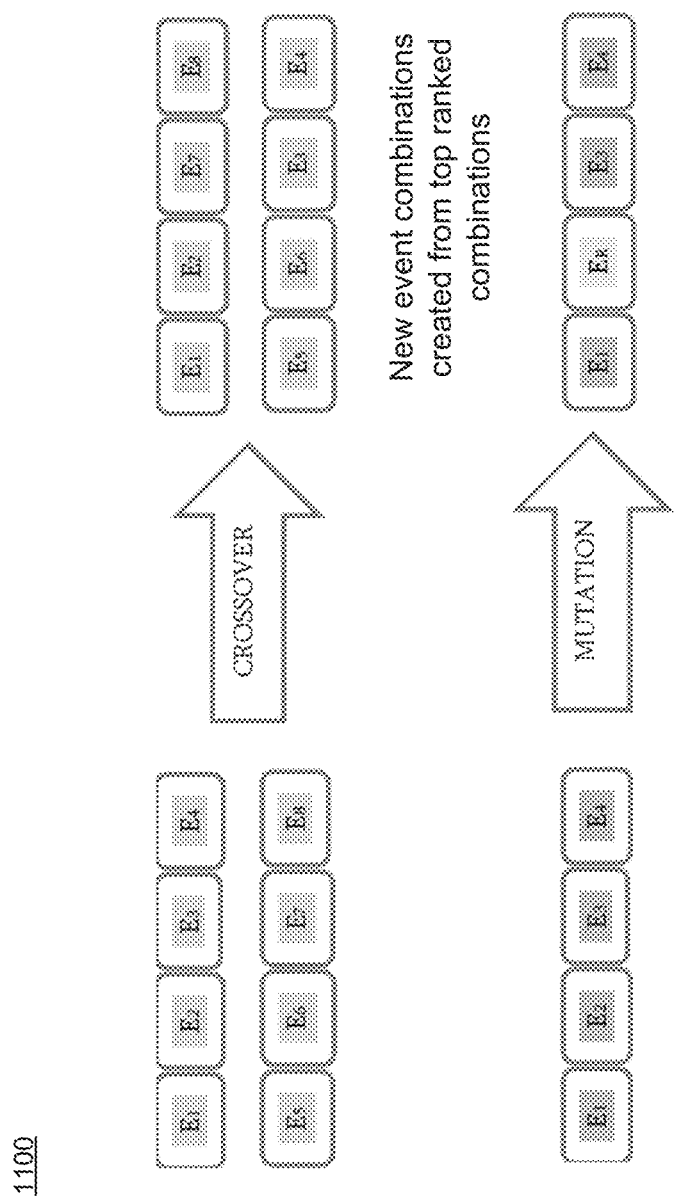
FIG. 11 is a diagram that illustrates a process 1100 in which crossover and mutation operators are applied on event combinations.

In some examples the GA uses cross-over and mutation operators for creating new possibly better combinations. Crossover is a mechanism in which more than one combination with highest detection accuracy are selected to create one or more offspring. The offspring will have genetic material of both event combinations (parents). Mutation is a genetic operator used to maintain genetic diversity from one generation of population to the next so that global optimal solution is reached instead of the local optimal solution. FIG. 11 is a diagram that illustrates a process 1100 in which crossover and mutation operators are applied on event combinations.

In some example a ML model is created based on the collected data for the event combination. For example, the data generated for each event combination is labeled for malware and benign applications and a ML model is created. A new set of unseen data is used for inference of ML model. The detection accuracy of model for a malware class is used to rank the event combinations. Examples of ML classifier to find detection accuracy of event combinations includes but not limited to a Random Forest Classifier and/or a XGBoost Classifier.

Exemplary Computing Architecture

Figure 12:
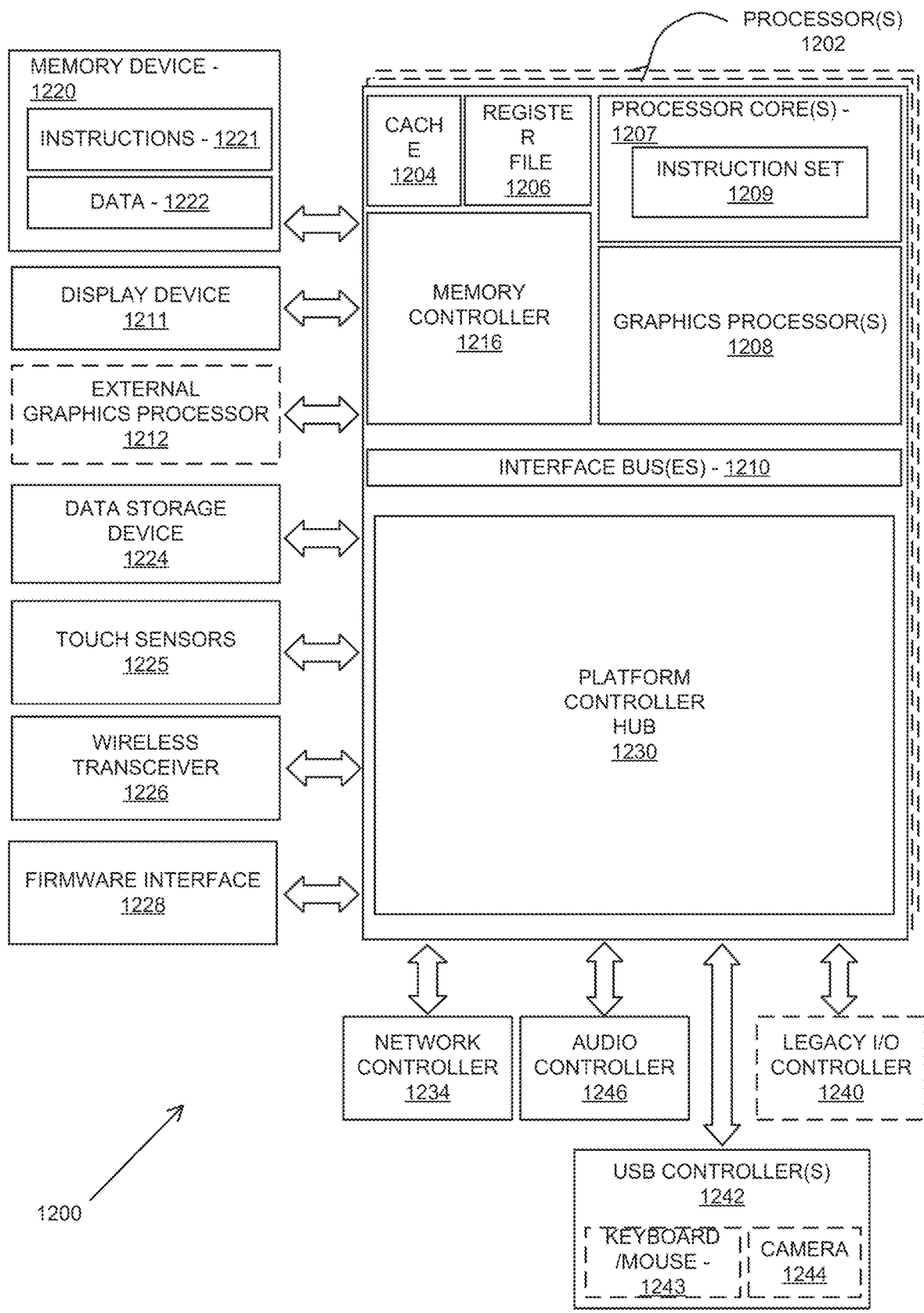
FIG. 12 is a block diagram illustrating a computing architecture which may be adapted to provide a method for secure PUF-based authentication using adversarial challenge selection according to an embodiment.

FIG. 12 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 1200 may comprise or be implemented as part of an electronic device. In some embodiments, the computing architecture 1200 may be representative, for example, of a computer system that implements one or more components of the operating environments described above. In some embodiments, computing architecture 1200 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 includes one or more processors 1202 and one or more graphics processors 1208, and may be a single processor desktop system, a multiprocessor workstation system, or a server system having a large number of processors 1202 or processor cores 1207. In on embodiment, the system 1200 is a processing platform incorporated within a system-on-a-chip (SoC or SOC) integrated circuit for use in mobile, handheld, or embedded devices.

An embodiment of system 1200 can include, or be incorporated within, a server-based gaming platform, a game console, including a game and media console, a mobile gaming console, a handheld game console, or an online game console. In some embodiments system 1200 is a mobile phone, smart phone, tablet computing device or mobile Internet device. Data processing system 1200 can also include, couple with, or be integrated within a wearable device, such as a smart watch wearable device, smart eyewear device, augmented reality device, or virtual reality device. In some embodiments, data processing system 1200 is a television or set top box device having one or more processors 1202 and a graphical interface generated by one or more graphics processors 1208.

In some embodiments, the one or more processors 1202 each include one or more processor cores 1207 to process instructions which, when executed, perform operations for system and user software. In some embodiments, each of the one or more processor cores 1207 is configured to process a specific instruction set 1214. In some embodiments, instruction set 1209 may facilitate Complex Instruction Set Computing (CISC), Reduced Instruction Set Computing (RISC), or computing via a Very Long Instruction Word (VLIW). Multiple processor cores 1207 may each process a different instruction set 1209, which may include instructions to facilitate the emulation of other instruction sets. Processor core 1207 may also include other processing devices, such a Digital Signal Processor (DSP).

In some embodiments, the processor 1202 includes cache memory 1204. Depending on the architecture, the processor 1202 can have a single internal cache or multiple levels of internal cache. In some embodiments, the cache memory is shared among various components of the processor 1202. In some embodiments, the processor 1202 also uses an external cache (e.g., a Level-3 (L3) cache or Last Level Cache (LLC)) (not shown), which may be shared among processor cores 1207 using known cache coherency techniques. A register file 1206 is additionally included in processor 1202 which may include different types of registers for storing different types of data (e.g., integer registers, floating point registers, status registers, and an instruction pointer register). Some registers may be general-purpose registers, while other registers may be specific to the design of the processor 1202.

In some embodiments, one or more processor(s) 1202 are coupled with one or more interface bus(es) 1210 to transmit communication signals such as address, data, or control signals between processor 1202 and other components in the system. The interface bus 1210, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 1202 include an integrated memory controller 1216 and a platform controller hub 1230. The memory controller 1216 facilitates communication between a memory device and other components of the system 1200, while the platform controller hub (PCH) 1230 provides connections to I/O devices via a local I/O bus.

Memory device 1220 can be a dynamic random-access memory (DRAM) device, a static random-access memory (SRAM) device, flash memory device, phase-change memory device, or some other memory device having suitable performance to serve as process memory. In one embodiment the memory device 1220 can operate as system memory for the system 1200, to store data 1222 and instructions 1221 for use when the one or more processors 1202 execute an application or process. Memory controller hub 1216 also couples with an optional external graphics processor 1212, which may communicate with the one or more graphics processors 1208 in processors 1202 to perform graphics and media operations. In some embodiments a display device 1211 can connect to the processor(s) 1202. The display device 1211 can be one or more of an internal display device, as in a mobile electronic device or a laptop device or an external display device attached via a display interface (e.g., DisplayPort, etc.). In one embodiment the display device 1211 can be a head mounted display (HMD) such as a stereoscopic display device for use in virtual reality (VR) applications or augmented reality (AR) applications.

In some embodiments the platform controller hub 1230 enables peripherals to connect to memory device 1220 and processor 1202 via a high-speed I/O bus. The I/O peripherals include, but are not limited to, an audio controller 1246, a network controller 1234, a firmware interface 1228, a wireless transceiver 1226, touch sensors 1225, a data storage device 1224 (e.g., hard disk drive, flash memory, etc.). The data storage device 1224 can connect via a storage interface (e.g., SATA) or via a peripheral bus, such as a Peripheral Component Interconnect bus (e.g., PCI, PCI Express). The touch sensors 1225 can include touch screen sensors, pressure sensors, or fingerprint sensors. The wireless transceiver 1226 can be a Wi-Fi transceiver, a Bluetooth transceiver, or a mobile network transceiver such as a 3G, 4G, Long Term Evolution (LTE), or 5G transceiver. The firmware interface 1228 enables communication with system firmware, and can be, for example, a unified extensible firmware interface (UEFI). The network controller 1234 can enable a network connection to a wired network. In some embodiments, a high-performance network controller (not shown) couples with the interface bus 1210. The audio controller 1246, in one embodiment, is a multi-channel high definition audio controller. In one embodiment the system 1200 includes an optional legacy I/O controller 1240 for coupling legacy (e.g., Personal System 2 (PS/2)) devices to the system. The platform controller hub 1230 can also connect to one or more Universal Serial Bus (USB) controllers 1242 connect input devices, such as keyboard and mouse 1243 combinations, a camera 1244, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising generating a first set of hardware performance counter (HPC) events that is ranked based on an ability of an individual HPC event to profile a malware class; generating, from a subset of the first set of HPC events, a second set of HPC event combinations that is ranked based on an ability of a set of at least two joint HPC events to profile a malware class; generating, from a subset of the second set of HPC event combinations, a third set of extended HPC event combinations; profiling one or more malware events and one or more benign applications to obtain a detection accuracy parameter for each malware event in the one or more malware events; applying a machine learning (ML) model using the third set of HPC event combinations to rank the third set of HPC event combinations based on malware detection accuracy; and applying a genetic algorithm to the third set of HPC event combinations to identify a subset of the third set of extended combinations of HPC events to be used for malware detection and classification.

Example 2 includes the subject matter of Example 1, further comprising applying an information gain analysis to determine the ability of an individual HPC event to profile a malware class.

Example 3 includes the subject matter of Examples 1-2, further comprising creating a candidate set of two-event HPC event combinations from the subset of the first set of HPC events; collecting data records of benign classes and malicious classes for the candidate set of two-event HPC event combinations; applying an information gain analysis to measure a joint information gain of the candidate set of two-event HPC event combinations; and ranking the candidate set of two-event HPC event combinations based on the joint information gain.

Example 4 includes the subject matter of Examples 1-3, further comprising applying a machine learning (ML) model using the second set of HPC event combinations to rank the second set of HPC event combinations based on malware detection accuracy.

Example 5 includes the subject matter of Examples 1-4, further comprising applying a genetic algorithm to the second set of HPC event combinations to creating a candidate set of two-event HPC event combinations from the subset of the first set of HPC events.

Example 6 includes the subject matter of Examples 1-5, wherein the genetic algorithm applies one or more crossover operators and one or more mutation operators to create a candidate set of two-event HPC event combinations from the subset of the first set of HPC events.

Example 7 includes the subject matter of Examples 1-6 further comprising selecting, from the subset of the third set of extended combinations of HPC events, a single combination of HPC events to be used for malware detection and classification.

Example 8 is an apparatus, comprising a processor; and a computer readable memory comprising instructions which, when executed by the processor, cause the processor to generate a first set of hardware performance counter (HPC) events that is ranked based on an ability of an individual HPC event to profile a malware class; generate, from a subset of the first set of HPC events, a second set of HPC event combinations that is ranked based on an ability of a set of at least two joint HPC events to profile a malware class; generate, from a subset of the second set of HPC event combinations, a third set of extended HPC event combinations; profile one or more malware events and one or more benign applications to obtain a detection accuracy parameter for each malware event in the one or more malware events; apply a machine learning (ML) model using the third set of HPC event combinations to rank the third set of HPC event combinations based on malware detection accuracy; and apply a genetic algorithm to the third set of HPC event combinations to identify a subset of the third set of extended combinations of HPC events to be used for malware detection and classification.

Example 9 includes the subject matter of Example 8, further comprising instructions which, when executed by the processor, cause the processor to apply an information gain analysis to determine the ability of an individual HPC event to profile a malware class.

Example 10 includes the subject matter of Examples 8-9 the computer readable memory comprising instructions which, when executed by the processor, cause the processor to iteratively create a candidate set of two-event HPC event combinations from the subset of the first set of HPC events; collect data records of benign classes and malicious classes for the candidate set of two-event HPC event combinations; apply an information gain analysis to measure a joint information gain of the candidate set of two-event HPC event combinations; and rank the candidate set of two-event HPC event combinations based on the joint information gain.

Example 11 includes the subject matter of Examples 8-10, the computer readable memory comprising instructions which, when executed by the processor, cause the processor to apply a machine learning (ML) model using the second set of HPC event combinations to rank the second set of HPC event combinations based on malware detection accuracy.

Example 12 includes the subject matter of Examples 8-11, further comprising instructions which, when executed by the processor, cause the processor to apply a genetic algorithm to the second set of HPC event combinations to creating a candidate set of two-event HPC event combinations from the subset of the first set of HPC events.

Example 13 includes the subject matter of Examples 8-12, wherein the genetic algorithm applies one or more cross-over operators and one or more mutation operators to create a candidate set of two-event HPC event combinations from the subset of the first set of HPC events.

Example 14 includes the subject matter of Examples 8-13, the computer readable memory comprising instructions which, when executed by the processor, cause the processor to select, from the subset of the third set of extended combinations of HPC events, a single combination of HPC events to be used for malware detection and classification.

Example 15 is one or more computer-readable storage media comprising instructions stored thereon that, in response to being executed, cause a computing device to generate a first set of hardware performance counter (HPC) events that is ranked based on an ability of an individual HPC event to profile a malware class; generate, from a subset of the first set of HPC events, a second set of HPC event combinations that is ranked based on an ability of a set of at least two joint HPC events to profile a malware class; generate, from a subset of the second set of HPC event combinations, a third set of extended HPC event combinations; profile one or more malware events and one or more benign applications to obtain a detection accuracy parameter for each malware event in the one or more malware events; apply a machine learning (ML) model using the third set of HPC event combinations to rank the third set of HPC event combinations based on malware detection accuracy; and apply a genetic algorithm to the third set of HPC event combinations to identify a subset of the third set of extended combinations of HPC events to be used for malware detection and classification.

Example 16 includes the subject matter of Examples 13-15, further comprising instructions stored thereon that, in response to being executed, cause the computing device to apply an information gain analysis to determine the ability of an individual HPC event to profile a malware class.

Example 17 includes the subject matter of Examples 15-16, further comprising instructions stored thereon that, in response to being executed, cause the computing device to iteratively create a candidate set of two-event HPC event combinations from the subset of the first set of HPC events; collect data records of benign classes and malicious classes for the candidate set of two-event HPC event combinations; apply an information gain analysis to measure a joint information gain of the candidate set of two-event HPC event combinations; and rank the candidate set of two-event HPC event combinations based on the joint information gain.

Example 18 includes the subject matter of Examples 15-17, further comprising instructions stored thereon that, in response to being executed, cause the computing device to apply a machine learning (ML) model using the second set of HPC event combinations to rank the second set of HPC event combinations based on malware detection accuracy.

Example 19 includes the subject matter of Examples 15-18, further comprising instructions stored thereon that, in response to being executed, cause the computing device to further comprise instructions stored thereon that, in response to being executed, cause the computing device to apply a genetic algorithm to the second set of HPC event combinations to creating a candidate set of two-event HPC event combinations from the subset of the first set of HPC events.

Example 20 includes the subject matter of Examples 15-19, wherein the genetic algorithm applies one or more cross-over operators and one or more mutation operators to create a candidate set of two-event HPC event combinations from the subset of the first set of HPC events.

Example 21 includes the subject matter of Examples 15-20, further comprising instructions stored thereon that, in response to being executed, cause the computing device to select, from the subset of the third set of extended combinations of HPC events, a single combination of HPC events to be used for malware detection and classification.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A method comprising:
   generating a first set of hardware performance counter (HPC) events that is ranked based on an ability of an individual HPC event to profile a malware class;
   generating, from a subset of the first set of HPC events, a second set of HPC event combinations that is ranked based on an ability of a set of at least two joint HPC events to profile a malware class;
   generating, from a subset of the second set of HPC event combinations, a third set of extended HPC event combinations;
   profiling one or more malware events and one or more benign applications to obtain a detection accuracy parameter for each malware event in the one or more malware events;
   applying a machine learning (ML) model using the third set of HPC event combinations to rank the one or more malware events based their respective ability to detect a malware class from one or more benign applications to generate a set of ranked events that are ordered by an information gain parameter; and
   applying a genetic algorithm to the third set of HPC event combinations to identify a subset of the third set of extended combinations of HPC events to be used for malware detection and classification.

2. The method of claim 1, further comprising:
   applying an information gain analysis to determine the ability of an individual HPC event to profile a malware class.

3. The method of claim 2, further comprising iteratively:
   creating a candidate set of two-event HPC event combinations from the subset of the first set of HPC events;
   collecting data records of benign classes and malicious classes for the candidate set of two-event HPC event combinations;
   applying an information gain analysis to measure a joint information gain of the candidate set of two-event HPC event combinations; and
   ranking the candidate set of two-event HPC event combinations based on the joint information gain.

4. The method of claim 3, further comprising:
   applying a machine learning (ML) model using the second set of HPC event combinations to rank the second set of HPC event combinations based on malware detection accuracy.

5. The method of claim 4, further comprising:
   applying a genetic algorithm to the second set of HPC event combinations to creating a candidate set of two-event HPC event combinations from the subset of the first set of HPC events.

6. The method of claim 5, wherein the genetic algorithm applies one or more cross-over operators and one or more mutation operators to create a candidate set of two-event HPC event combinations from the subset of the first set of HPC events.

7. The method of claim 1, further comprising:
   selecting, from the subset of the third set of extended combinations of HPC events, a single combination of HPC events to be used for malware detection and classification.

8. An apparatus comprising:
   a processor; and
   a computer readable memory comprising instructions which, when executed by the processor, cause the processor to:
   generate a first set of hardware performance counter (HPC) events that is ranked based on an ability of an individual HPC event to profile a malware class;
   generate, from a subset of the first set of HPC events, a second set of HPC event combinations that is ranked based on an ability of a set of at least two joint HPC events to profile a malware class;
   generate, from a subset of the second set of HPC event combinations, a third set of extended HPC event combinations;
   profile one or more malware events and one or more benign applications to obtain a detection accuracy parameter for each malware event in the one or more malware events;
   apply a machine learning (ML) model using the third set of HPC event combinations to rank the one or more malware events based their respective ability to detect a malware class from one or more benign applications to generate a set of ranked events that are ordered by an information gain parameter; and
   apply a genetic algorithm to the third set of HPC event combinations to identify a subset of the third set of extended combinations of HPC events to be used for malware detection and classification.

9. The apparatus of claim 8, the computer readable memory comprising instructions which, when executed by the processor, cause the processor to:
   apply an information gain analysis to determine the ability of an individual HPC event to profile a malware class.

10. The apparatus of claim 9, the computer readable memory comprising instructions which, when executed by the processor, cause the processor to iteratively:
    create a candidate set of two-event HPC event combinations from the subset of the first set of HPC events;
    collect data records of benign classes and malicious classes for the candidate set of two-event HPC event combinations;
    apply an information gain analysis to measure a joint information gain of the candidate set of two-event HPC event combinations; and
    rank the candidate set of two-event HPC event combinations based on the joint information gain.

11. The apparatus of claim 10, the computer readable memory comprising instructions which, when executed by the processor, cause the processor to:
  apply a machine learning (ML) model using the second set of HPC event combinations to rank the second set of HPC event combinations based on malware detection accuracy.

12. The apparatus of claim 11, the computer readable memory comprising instructions which, when executed by the processor, cause the processor to:
  apply a genetic algorithm to the second set of HPC event combinations to creating a candidate set of two-event HPC event combinations from the subset of the first set of HPC events.

13. The apparatus of claim 12, wherein the genetic algorithm applies one or more cross-over operators and one or more mutation operators to create a candidate set of two-event HPC event combinations from the subset of the first set of HPC events.

14. The apparatus of claim 8, the computer readable memory comprising instructions which, when executed by the processor, cause the processor to
  select, from the subset of the third set of extended combinations of HPC events, a single combination of HPC events to be used for malware detection and classification.

15. One or more computer-readable storage media comprising instructions stored thereon that, in response to being executed, cause a computing device to:
  generate a first set of hardware performance counter (HPC) events that is ranked based on an ability of an individual HPC event to profile a malware class;
  generate, from a subset of the first set of HPC events, a second set of HPC event combinations that is ranked based on an ability of a set of at least two joint HPC events to profile a malware class;
  generate, from a subset of the second set of HPC event combinations, a third set of extended HPC event combinations;
  profile one or more malware events and one or more benign applications to obtain a detection accuracy parameter for each malware event in the one or more malware events;
  apply a machine learning (ML) model using the third set of HPC event combinations to rank the one or more malware events based their respective ability to detect a malware class from one or more benign applications to generate a set of ranked events that are ordered by an information gain parameter; and
  apply a genetic algorithm to the third set of HPC event combinations to identify a subset of the third set of extended combinations of HPC events to be used for malware detection and classification.

16. The one or more computer-readable storage media of claim 15, further comprising instructions stored thereon that, in response to being executed, cause the computing device to:
  apply an information gain analysis to determine the ability of an individual HPC event to profile a malware class.

17. The one or more computer-readable storage media of claim 16, further comprising instructions stored thereon that, in response to being executed, cause the computing device to iteratively:
  create a candidate set of two-event HPC event combinations from the subset of the first set of HPC events;
  collect data records of benign classes and malicious classes for the candidate set of two-event HPC event combinations;
  apply an information gain analysis to measure a joint information gain of the candidate set of two-event HPC event combinations; and
  rank the candidate set of two-event HPC event combinations based on the joint information gain.

18. The one or more computer-readable storage media of claim 17, further comprising instructions stored thereon that, in response to being executed, cause the computing device to:
  apply a machine learning (ML) model using the second set of HPC event combinations to rank the second set of HPC event combinations based on malware detection accuracy.

19. The one or more computer-readable storage media of claim 18, further comprising instructions stored thereon that, in response to being executed, cause the computing device to:
  apply a genetic algorithm to the second set of HPC event combinations to creating a candidate set of two-event HPC event combinations from the subset of the first set of HPC events.

20. The one or more computer-readable storage media of claim 19, wherein the genetic algorithm applies one or more cross-over operators and one or more mutation operators to create a candidate set of two-event HPC event combinations from the subset of the first set of HPC events.

21. The one or more computer-readable storage media of claim 15, further comprising instructions stored thereon that, in response to being executed, cause the computing device to
  select, from the subset of the third set of extended combinations of HPC events, a single combination of HPC events to be used for malware detection and classification.

* * * * *